United States Patent
Gupta et al.

(10) Patent No.: US 11,729,631 B2
(45) Date of Patent: *Aug. 15, 2023

(54) SYSTEM AND METHOD OF AUTOMATIC OUTDOOR SMALL CELL PLANNING

(71) Applicant: Jio Platforms Limited, Gujarat (IN)

(72) Inventors: Deepak Gupta, Navi Mumbai (IN); Vijay Mohan Verma, Navi Mumbai (IN); Brijesh I Shah, Navi Mumbai (IN); Arun Karunakaran Nair, Navi Mumbai (IN); Kunala Vidyasagar, Thane (IN); Aditya Ganesh, Navi Mumbai (IN)

(73) Assignee: Jio Platforms Limited, Gujarat (IN)

( * ) Notice: Subject to any disclaimer, the term of this patent is extended or adjusted under 35 U.S.C. 154(b) by 0 days.

This patent is subject to a terminal disclaimer.

(21) Appl. No.: 17/818,502

(22) Filed: Aug. 9, 2022

(65) Prior Publication Data

US 2022/0386137 A1 Dec. 1, 2022

Related U.S. Application Data

(63) Continuation of application No. 17/106,904, filed on Nov. 30, 2020, now Pat. No. 11,412,390.

(30) Foreign Application Priority Data

Nov. 29, 2019 (IN) .............................. 201921049242

(51) Int. Cl.
*H04W 16/18* (2009.01)
*H04W 24/02* (2009.01)
(Continued)

(52) U.S. Cl.
CPC ........... *H04W 16/18* (2013.01); *H04W 24/02* (2013.01); *H04W 64/003* (2013.01); *H04W 84/045* (2013.01); *G07F 17/0078* (2013.01)

(58) Field of Classification Search
CPC ... H04W 16/18; H04W 24/02; H04W 64/003; H04W 84/045; H04W 16/22;
(Continued)

(56) References Cited

U.S. PATENT DOCUMENTS

| 8,630,652 B2 | 1/2014 | Monogioudis |
| 9,439,081 B1 | 9/2016 | Knebl |

(Continued)

FOREIGN PATENT DOCUMENTS

EP 2775782 A1 9/2014

OTHER PUBLICATIONS

W. Guo, S. Wang, X. Chu, J. Zhang, J. Chen and H. Song, "Automated Small-Cell Deployment for Heterogeneous Cellular Networks," in IEEE Communications Magazine, vol. 51, No. 5, pp. 46-53, May 2013, doi: 10.1109/MCOM.2013.6515046. (Year: 2013).

*Primary Examiner* — Matthew C Sams
(74) *Attorney, Agent, or Firm* — Finnegan, Henderson, Farabow, Garrett & Dunner LLP

(57) ABSTRACT

A system and method for automatic deployment of at least one outdoor small cell. The method comprises dynamically collecting traffic data corresponding to a geographic location associated with a cellular network by a data collection module [202]. Next, a data collection module [204] automatically identifies a group of spatial grids from the one or more cells within the geographic location based on the traffic data and automatically determines one or more locations within the geographic locations for deploying the at least one outdoor small cell based on the identified group of spatial grids. A backhaul link clearance module [206] automatically determines a backhaul connection between the one or more determined locations with the cellular network. An azimuth planning module [208] automatically determines an azimuth for the at least one outdoor small cell based on the (Continued)

determined connection. A deployment unit [210] deploy the at least one outdoor small cell.

6 Claims, 14 Drawing Sheets

(51) Int. Cl.
*H04W 64/00* (2009.01)
*H04W 84/04* (2009.01)
*G07F 17/00* (2006.01)

(58) Field of Classification Search
CPC . H04W 24/08; H04W 16/32; H04W 52/0245; H04W 72/085; H04W 88/18; H04W 88/085; H04W 72/10
See application file for complete search history.

(56) References Cited

U.S. PATENT DOCUMENTS

| | | | |
|---|---|---|---|
| 9,585,036 B1 | 2/2017 | Tektumanidze | |
| 10,149,172 B2 * | 12/2018 | Cheng | H04W 16/18 |
| 10,477,426 B1 | 11/2019 | Tiwari | |
| 11,265,731 B1 * | 3/2022 | Greenough | H04W 24/02 |
| 11,412,390 B2 * | 8/2022 | Gupta | H04W 24/02 |
| 2013/0170383 A1 * | 7/2013 | Cho | G01S 5/02524 |
| | | | 370/252 |
| 2014/0141788 A1 | 5/2014 | Puthenpura | |
| 2014/0240194 A1 | 8/2014 | Trojer | |
| 2015/0365959 A1 | 12/2015 | Coldrey | |
| 2016/0269911 A1 | 9/2016 | Cheng | |
| 2016/0338118 A1 * | 11/2016 | Vajapeyam | H04B 17/318 |
| 2017/0150365 A1 | 5/2017 | Goswami | |
| 2017/0331670 A1 | 11/2017 | Parkvall | |
| 2020/0229206 A1 * | 7/2020 | Badic | H04W 40/22 |
| 2021/0168623 A1 | 6/2021 | Gupta | |
| 2022/0329524 A1 * | 10/2022 | Sinha | H04L 41/145 |

* cited by examiner

SYSTEM AND METHOD OF AUTOMATIC OUTDOOR SMALL CELL PLANNING

TECHNICAL FIELD

The present invention generally relates to Heterogenous Networks (HetNet) and more particularly relates to automatic deployment for outdoor small cells for cellular networks.

BACKGROUND OF THE INVENTION

The following description of related art is intended to provide background information pertaining to the field of the invention. This section may include certain aspects of the art that may be related to various features of the present invention. However, it should be appreciated that this section be used only to enhance the understanding of the reader with respect to the present invention, and not as admissions of prior art.

In a traditional cellular deployment, service operators are now reinforcing their macro-cells deployment with one or multiple low powered small cellular cells (generally termed as Femto/Pico/Micro cells) placed at multiple strategic locations within one or more macro coverage areas. This kind of reinforced cellular network is generally termed as Heterogeneous Network, in short, HetNet. For a typical HetNet, strategic locations for small cells generally include areas with high density of users, such as shopping malls, airports, railway/bus stations, colleges, etc. Also, these locations might include areas with dead-spots, or areas with low macro signal strength, such as indoor establishments or peripheral locations of a macro coverage area. HetNet provides increased mobile data capacity along with providing better mobile coverage, thereby enhancing the overall user's mobile broadband experience.

Wi-Fi technology based on IEEE 802.11 standards has witnessed tremendous growth and commercialization in the recent years. Almost all the available user devices (or user equipment) with cellular capability support also tend to have Wi-Fi capability in order to connect to Wi-Fi networks operating in the unlicensed frequency bands, either 2.4 GHz or 5 GHz. Therefore, the cellular operators are motivated to use ubiquitous and cost-effective Wi-Fi technology in pursuing the overall HetNet strategy, for instance, deploying low powered Wi-Fi cells along with cellular small cells at multiple strategic locations identified for a HetNet. Further, for ease of maintenance and provision, few operators are also beginning to use Wi-Fi integrated versions of small cellular cells, wherein a Wi-Fi and cellular small cell technology are made available on common equipment.

FIG. 1 illustrates an exemplary block diagram representation of a heterogenous communication network architecture [100]. Referring to FIG. 1 illustrates an exemplary block diagram representation of a heterogenous communication network architecture [100], in accordance with exemplary embodiments of the present invention. As shown in FIG. 1, the heterogenous wireless communication network [100] comprises of a macro base station [101A] wide area overlay mobility coverage, and one or more micro base station [101B, 101C] further connected to Wi-Fi access points [101E, 101F, 101G, 101H, 101I] and a micro base station [101D] with built-in Wi-Fi access point capability.

Traditionally, cellular network deployment has been primarily designed for outdoor coverage for voice services, which are achieved by overcoming the stochastic nature of the radio propagation environment. In the past decades, there have been an unprecedented growth in mobile data demand which led to revolutions in the multiple-access technology as well as an increase in cell density and spectrum reuse. The third, fourth and upcoming fifth generation cellular networks mostly employ full bandwidth reuse (reuse pattern one), and the cell density in urban areas is in excess of 6 cells per square kilometer per Service Operator. This has yielded a system-level capacity that is largely interference-limited, as opposed to propagation-limited.

Owing to such a dense network, more than one server is generally present in almost all the areas experiencing interference and degradation in the overall quality of the network. Some areas may also experience poor RF quality which also degrades the network performance and deteriorates the user experience. The Service Operators are dependent on drive test measurements to obtain the channel quality measurements of any area. The drive test measurement is very costly and time-consuming process. In addition to this, the drive test collects samples of outdoor areas of the network only whereas more than 70% of data traffic is generated from the indoor scenario like residential building or enterprise building. These are some drawbacks in conventional optimization methods, which motivated the need for a novel optimization technique.

The existing optimization techniques requires performing manual drive test measurements and then analyzing the measurements to optimize the network. The drive samples are plotted on a geographical post-processing tool to identify geographical areas poor RSRP and poor SINR. The cells serving in that geographical area are also plotted to identify the servers in the identified geographical areas and the previous activity of these servers are studied. The cells resulting into poor quality in the desired area are then considered for optimization and then physical changes are suggested which is based on an operators' defined process. Further, the drive test based conventional optimization process cannot be made continuous process because of the unavailability of daily drive test data. At best, the drive test optimization is periodic as conducting drive tests are cost intensive.

An existing solution provides determination of small sell location based on usage of third-party small cell planning tool while ingesting geolocated data. Another existing solution suggests collecting the eNB and UE data followed by decoding them for determining the small cell location. This manual approach to identify the initial Small cell location where processor unit will be placed and then based on the transmission records from eNB and UE, it will take the decision of installing the Small Cell. However, none of the existing solutions provide for small cell orientation, height determination and information for determining RF coverage of neighboring sites to minimize interference. Therefore, in view of the above highlighted and other inherent limitations in the existing solutions, there exists a need in the art to provide a system and a method for automatic deployment of outdoor small cells.

SUMMARY

This section is provided to introduce certain objects and aspects of the present invention in a simplified form that are further described below in the detailed description. This summary is not intended to identify the key features or the scope of the claimed subject matter. In order to overcome at least a few problems associated with the known solutions as provided in the previous section, an object of the present invention is to provide a system and a method for automatic deployment of outdoor small cells in a geographical location. Another object of the present invention is to provide a system and a method for efficiently planning deployment of outdoor small cells to improve user experience in highly congested and poor coverage areas in an efficient and cost-effective manner without the requirement of manual drive test in a heterogeneous network. Yet another object of the present invention is to provide a system and a method for efficiently and effectively deploying outdoor small cells to improve user experience dramatically by offloading them from far away Macro Cells. Yet another object of the present invention is to provide users with the enhanced experience in high density areas, such as shopping malls, airports, railway/bus stations, colleges, etc. situated within a macro coverage area. Yet another object of the present invention is to provide coverage in area with dead-spots, or areas with low macro signal strength, such as indoor establishments or peripheral locations within a macro coverage area. Yet another object of the present invention is to provide a system and a method to provide seamless services to the users without any latency and call drops. Yet another object of the present invention is to provide a system and a method that facilitate cellular networks to handle high volume calls concurrently. Yet another object of the present invention is to provide a system and a method for automatic deployment of outdoor small cell that can be used across vendors or service operators in a Heterogeneous Network.

In order to achieve at least some of the above-mentioned objectives, the present invention provides a method and system for automatic deployment of at least one outdoor small cell in a geographic location. A first aspect of the present invention relates to a method for automatic deployment of at least one outdoor small cell in a geographic location. The method comprises dynamically collecting, by a data collection module, a traffic data corresponding to a geographic location associated with a cellular network comprising of one or more cells. Next, a location identification module automatically identifies a group of spatial grids from the one or more cells within the geographic location based on the traffic data. Subsequently, the location identification module automatically determines one or more locations within the geographic locations for deploying the at least one outdoor small cell based on the identified group of spatial grids. A backhaul link clearance module automatically determines a backhaul connection between the one or more determined locations with the cellular network. An azimuth planning module automatically determines an azimuth for the at least one outdoor small cell based on the determined connection. A deployment unit deploys the at least one outdoor small cell based on at least one of the determined one or more locations, the determined azimuth and the determined backhaul connection.

Another aspect of the present invention relates to a system for automatic deployment of at least one outdoor small cell in a geographic location. The system comprises a data collection module, a location identification module, a backhaul link clearance module, a deployment unit and an azimuth planning module, all the components are connected to each other. The data collection module is configured to collect a traffic data corresponding to a geographic location associated with a cellular network comprising of one or more cells. The location identification module is configured to automatically identify a group of spatial grids from the one or more cells within the geographic location based on the traffic data. The location identification module is also configured to automatically determine one or more locations within the geographic locations for deploying the at least one outdoor small cell based on the identified group of spatial grids. The backhaul link clearance module is configured to automatically determine a backhaul connection between the one or more determined locations with the cellular network. The azimuth planning module is configured to automatically determine an azimuth for the at least one outdoor small cell based on the determined connection. The deployment unit is configured to deploy the at least one outdoor small cell based on at least one of the determined one or more locations, the determined azimuth and the determined backhaul connection.

BRIEF DESCRIPTION OF DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components, electronic components or circuitry commonly used to implement such components.

Figure 1:
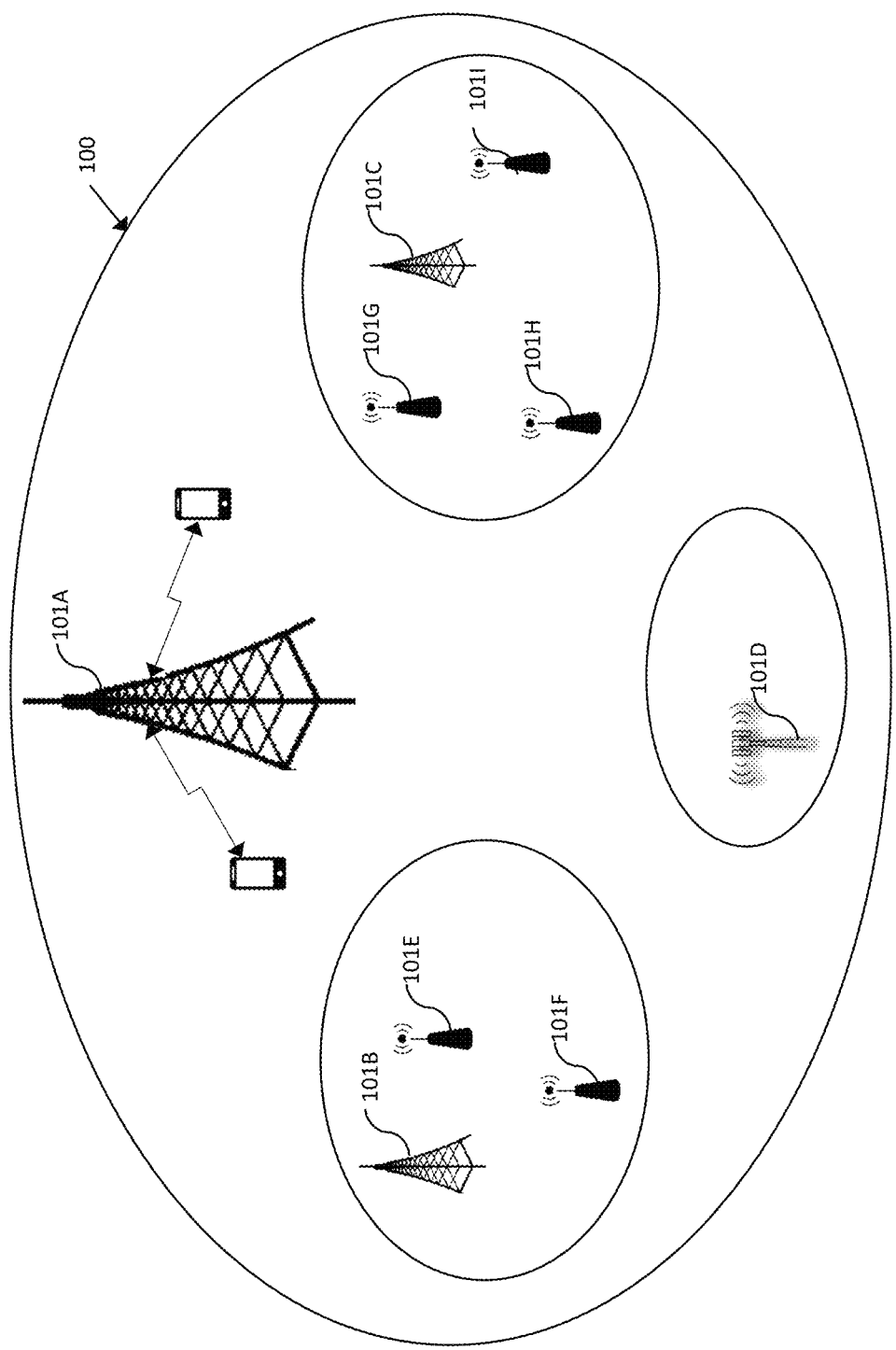
FIG. 1 illustrates an exemplary heterogenous network architecture diagram.

The foregoing shall be more apparent from the following more detailed description of the disclosure.

DETAILED DESCRIPTION OF THE EXEMPLARY EMBODIMENTS:

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a sequence diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As utilized herein, terms "component," "system," "platform," "node," "layer," "selector," "interface," and the like are intended to refer to a computer-related entity, hardware, software (e.g., in execution), and/or firmware. For example, a component can be a process running on a processor, a processor, an object, an executable, a program, a storage device, and/or a computer. By way of illustration, an application running on a server and the server can be a component. One or more components can reside within a process and a component can be localized on one computer and/or distributed between two or more computers.

Further, these components can execute from various computer-readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software application or a firmware application executed by a processor, wherein the processor can be internal or external to the apparatus and executes at least a part of the software or firmware application. As yet another example, a component can be any apparatus that provides specific functionality through electronic components without mechanical parts, the electronic components can include a processor therein to execute software or firmware that confers at least in part the functionality of the electronic components.

Moreover, terms like "source and/or destination user device (UE)", "mobile station", "smart computing device", "user device", "user device", "device", "smart mobile communications device", "mobile communication device", "mobile device", "mobile subscriber station," "access terminal," "terminal," "handset," "originating device," "terminating device," and similar terminology refers to any electrical, electronic, electro-mechanical computing device or equipment or a combination of one or more of the above devices. Smart computing devices may include, but not limited to, a mobile phone, smartphone, virtual reality (VR) devices, augmented reality (AR) devices, pager, laptop, a general-purpose computer, desktop, personal digital assistant, tablet computer, mainframe computer, or any other computing device as may be obvious to a person skilled in the art. In general, a smart computing device is a digital, user-configured, computer networked device that can be operated autonomously. A smart computing device is one of the appropriate systems for storing data and other private/sensitive information. The smart computing device operates at all the seven levels of ISO reference model, but the primary function is related to the application layer along with the network, session and presentation layer. The smart computing device may also have additional features of a touch screen, apps ecosystem, physical and biometric security, etc. Further, a 'smartphone' is one type of "smart computing device" that refers to the mobility wireless cellular connectivity device that allows end users to use services on cellular networks such as including but not limited to 2G, 3G, 4G, 5G and/or the like mobile broadband internet connections with an advanced mobile operating system which combines features of a personal computer operating system with other features useful for mobile or handheld use. These smartphones can access the Internet, have a touchscreen user interface, can run third-party apps including capability of hosting online applications, music players and are camera phones possessing high-speed mobile broadband 4G LTE internet with video calling, hotspot functionality, motion sensors, mobile payment mechanisms and enhanced security features with alarm and alert in emergencies. Mobility devices may include smartphones, wearable devices, smart-watches, smart bands, wearable augmented devices, etc. For the sake of specificity, the mobility device is referred to both feature phone and smartphones in present disclosure but does not limit the scope of the disclosure and may extend to any mobility device in implementing the technical solutions. The above smart devices including the smartphone as well as the feature phone including IoT devices enable the communication on the devices. Further, the foregoing terms are utilized interchangeably in the subject specification and related drawings.

Furthermore, the terms "user," "subscriber," "customer," "consumer," "owner," and the like are employed interchangeably throughout the subject specification and related drawings, unless context warrants particular distinction(s) among the terms. It should be appreciated that such terms can refer to human entities, or automated components supported through artificial intelligence, e.g., a capacity to make inference based on complex mathematical formulations, that can provide simulated vision, sound recognition, decision making, etc. In addition, the terms "wireless network" and "network" are used interchangeable in the subject application, unless context warrants particular distinction(s) among the terms.

As used herein, a "processor" or "processing unit" includes one or more processors, wherein processor refers to any logic circuitry for processing instructions. A processor may be a general-purpose processor, a special-purpose processor, a conventional processor, a digital signal processor, a plurality of microprocessors, one or more microprocessors in association with a DSP core, a controller, a microcontroller, a low-end microcontroller, Application Specific Integrated Circuits, Field Programmable Gate Array circuits, any other type of integrated circuits, etc. The processor may perform signal coding data processing, input/output processing, and/or any other functionality that enables the working of the system according to the present disclosure. More specifically, the processor or processing unit is a hardware processor.

The present invention relates to a method and a system for automatic deployment of at least one outdoor small cell (ODSC) in a geographic location. The present invention is directed to solve the problems associated with planning small cells based on performing manual drive tests. Thus, the solution of the present invention provides that, firstly, candidate locations are identified for outdoor small cell deployment based on the user density and poor coverage experienced by users in the geographical location. Subsequently, the feasibility of the backhaul link (Fiber/Microwave link) from the candidate locations to the nearest neighbor CSS site is determined. Further, a suitable azimuth for the proposed outdoor small cells is determined such that interference to the nearest neighbor is minimized. Accordingly, outdoor small cells are deployed on the candidate location based on the features of the proposed solution to improve the user experience in highly congested and poor coverage areas in an efficient and cost-effective manner without the requirement of performing drive tests.

Hereinafter, exemplary embodiments of the present disclosure will be described in detail with reference to the accompanying drawings so that those skilled in the art can easily carry out the present disclosure.

Figure 2:
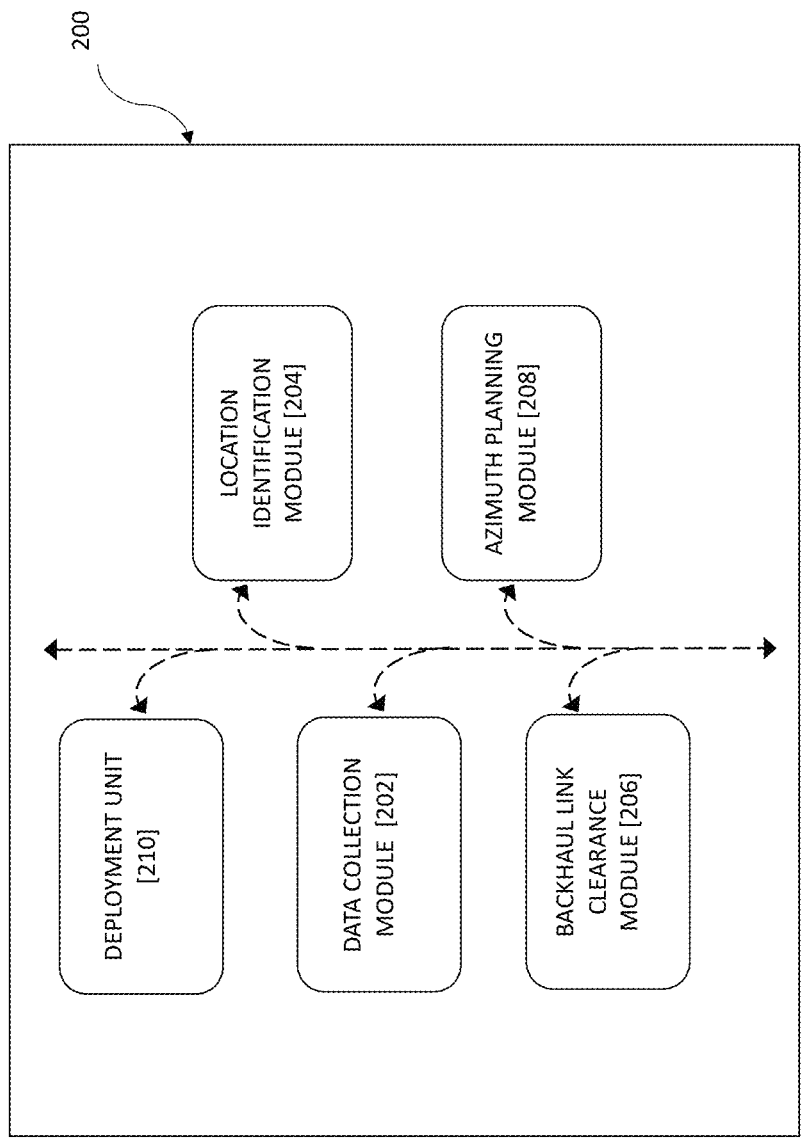
FIG. 2 illustrates an exemplary block diagram of a system for automatic deployment of at least one outdoor small cell, in accordance with exemplary embodiments of the present invention.

Referring to FIG. 2 illustrates an exemplary block diagram of a system for automatic deployment of at least one outdoor small cell for a cellular network in a geographical location, in accordance with exemplary embodiments of the present invention. The system broadly comprises a data collection module [202], a data collection module [204], a backhaul link clearance module [206] and an azimuth planning module [208], all the components are connected to each other unless otherwise indicated and work in conjunction to achieve the objects of the present invention. In an instance of the present invention, the network may be a wired network, a wireless network, or a combination thereof. The network may be a single network or a combination of two or more networks. The cellular network is responsible for providing cellular services to the user devices connected to the cellular network.

The data collection module [202] is configured to collect a traffic data corresponding to a geographic location associated with a cellular network comprising of one or more cells. The present invention encompasses that the traffic data comprises of usage information of the users connected to the cellular network, one or more characteristics of the cellular network including but not limited to Reference Signal Receive Power (RSRP).

The data collection module [204] is configured to automatically identify a group of spatial grids from the one or more cells within the geographic location based on the traffic data. The data collection module [204] is also configured to automatically determine one or more locations within the geographic locations for deploying the at least one outdoor small cell based on the identified group of spatial grids.

The present invention further encompasses that the data collection module [204] is further configured to extract one or more parameters for the one or more cells of the cellular network based on the traffic data received at the data collection module [202], wherein the one or more parameters comprises at least a RSRP. The data collection module [204] determines cell utilization for the each of the one or more cells. The data collection module [204] identifies one or more first set of spatial grids from the one or more cells based on a comparison of the determined cell utilization of the one or more cells with a threshold cell utilization. The data collection module [204] determines a severity value for each of the one or more first set of spatial grids based on a number of sessions. The data collection module [204] identifies one or more second set of spatial grids comprising the one or more first set of spatial grids based on the determined severity and a centroid distance of the one or more first set of spatial grids. The data collection module [204] determines a severity value for each of the one or more second set of spatial grids based on a number of sessions. The data collection module [204] selects the one or more first set of spatial grids of the one or more second set of spatial grids based on the severity value and the centroid distance of the one or more first set of spatial grids. The data collection module [204] calculates a priority score for each of the selected one or more first set of spatial grids of the one or more second set of spatial grids , wherein the priority score is calculated based on at least a RF priority score and a transmission priority score. The data collection module [204] identifies one or more third set of spatial grids as the group of spatial grids based on the calculated priority score.

Figure 3:
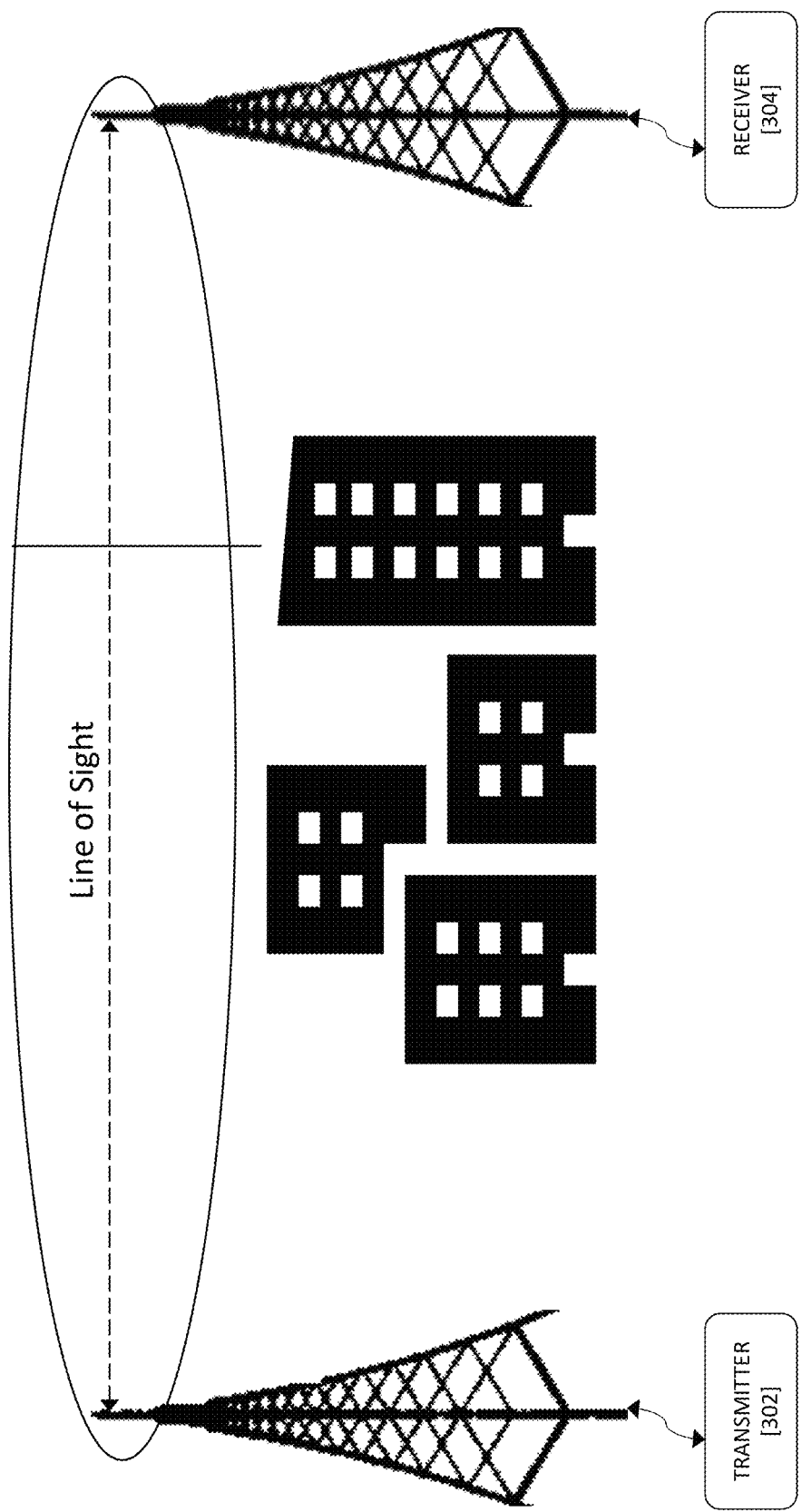
FIG. 3 illustrates an exemplary Line of Sight (LOS) Clearance method for viable UBR transmission, in accordance with exemplary embodiments of the present invention.
Figure 4:
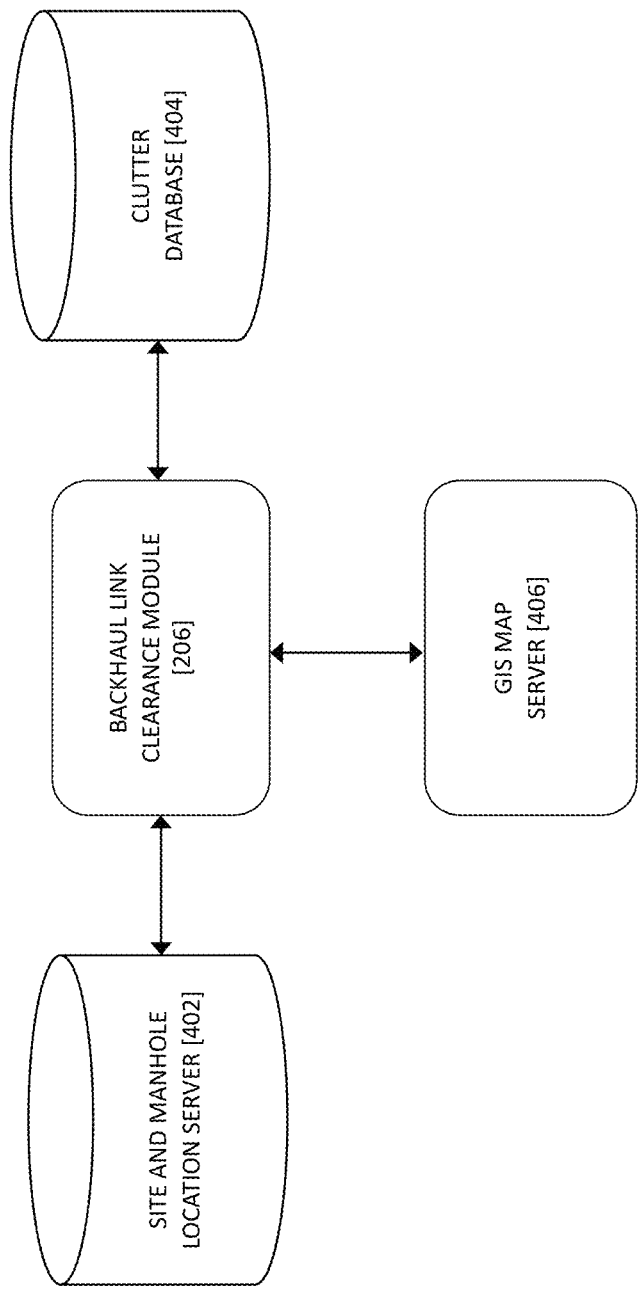
FIG. 4 illustrates an exemplary block diagram of the backhaul link clearance module [206], in accordance with exemplary embodiments of the present invention.

The backhaul link clearance module [206] is configured to automatically determine a backhaul connection between the one or more determined locations with the cellular network. As also illustrated in FIG. 4, the backhaul link clearance module [206] is further connected to a Clutter Database [404], a site and manhole location server [402] and a GIS Map Server [406]. The present invention further encompasses that backhaul link clearance module [206] receives one or more determined locations from the data collection module [204], a fibre manhole map from the site and manhole location server [402], a CSS site map and a GIS Map with 3D building data from the GIS Map Server [406]. The backhaul link clearance module [206] determines a line-of-sight (LOS) clearance and a Fresnel zone clearance between the at least one outdoor small cell and a neighboring CSS site. Referring to FIG. 3 illustrates an exemplary Line of Sight (LOS) Clearance method for viable UBR transmission. In an exemplary instance, a Fresnel Zone is calculated using the below equation:

$$F_n = \sqrt{\frac{n\lambda d_1 d_2}{d_1 + d_2}}$$

Where -
$F_n$=nth Fresnel Zone radius (m)
$d_1$=distance of P from Receiver (m)
$d_2$=distance of P from Transmitter (m)
$\lambda$=wavelength of the signal (m)

In another instance, LOS clearance is assessed by calculating the first (n=1) Fresnel zone radius [306], between points A and B of the backhaul link. The Fresnel Zone is calculated for each building identified by the GIS Mapping server as intercepting a line drawn between the transmitter and receiver.

The backhaul link clearance module [206] calculates a distance between the one or more determined locations and at least one neighbouring manhole. The backhaul link clearance module [206] determines a type for the backhaul connection between the one or more determined locations and the cellular network based on the determined LOS clearance, the determined Fresnel zone clearance and the calculated distance, wherein the type of the connection is one of a fiber connection, a microwave connection and a manhole connection.

The azimuth planning module [208] is configured to automatically determine an azimuth for the at least one outdoor small cell based on the determined connection. The azimuth planning module [208] receives the one or more determined locations for the at least one outdoor small cell from the data collection module [204]. The azimuth planning module [208] selects a set of cells located in a vicinity of the at least one outdoor small cell based on a comparison of the cell utilization of the set of cells with a threshold cell utilization (for instance, to identify highly utilized cells) wherein the set of cells face towards the at least one outdoor small cell. The azimuth planning module [208] calculates a bearing angle between the set of cells and the at least one outdoor small cell. The azimuth planning module [208] determines a preset value of the azimuth of the at least one outdoor small cell as the bearing angle. The azimuth planning module [208] iteratively adjusts an azimuth of the at least one outdoor small cell based on a comparison with a calculated azimuth value, and a building height of the one or more locations.

The system further comprises of a deployment unit [210] configured to deploy the at least one outdoor small cell based on at least one of the determined one or more locations, the determined azimuth and the determined backhaul connection. In an instance of the present invention, the deployment unit [210] comprises of physical hardware such as antennas, cables, etc. generally known to be required for deploying outdoor small cells.

Figure 5:
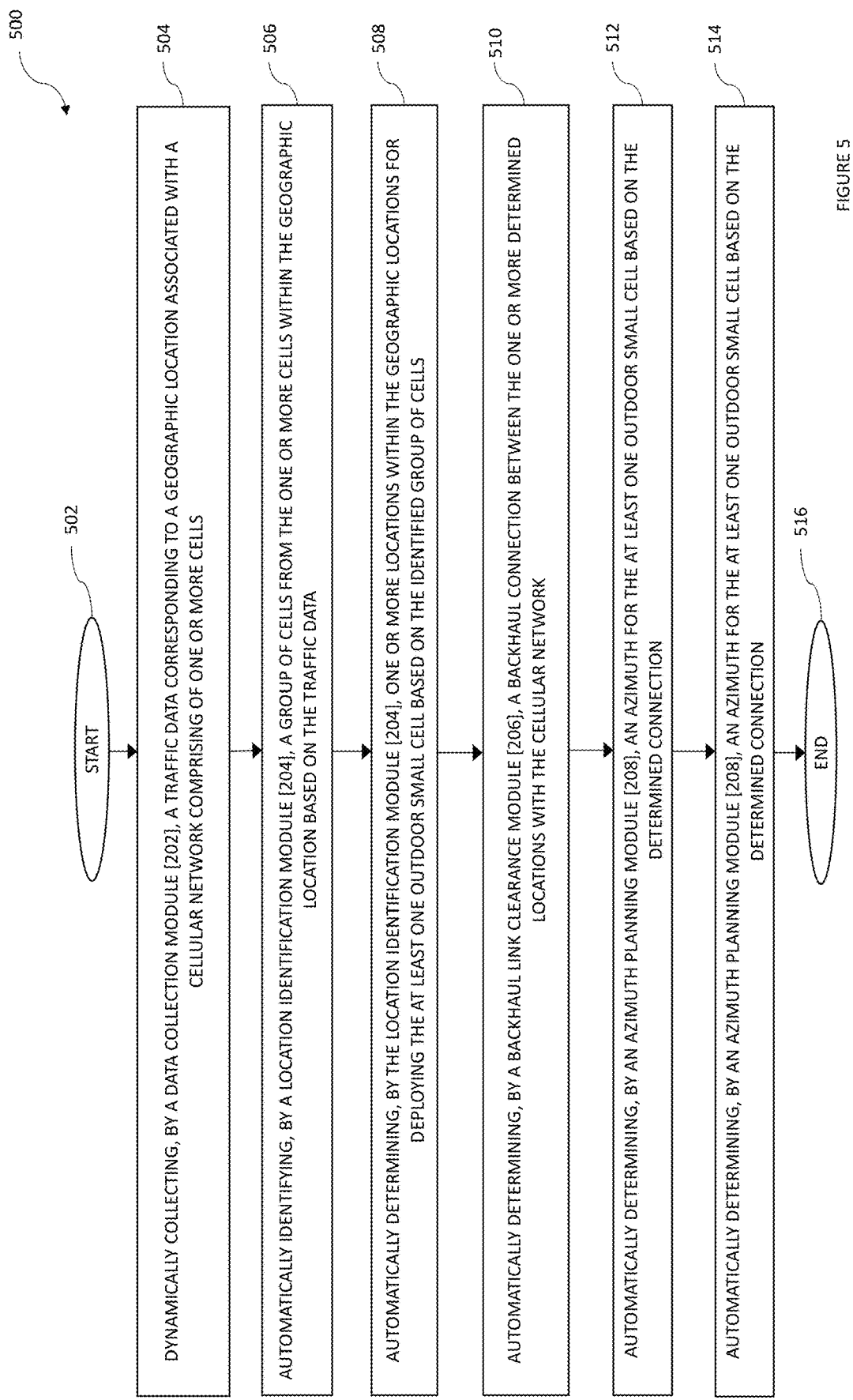
FIG. 5 illustrates an exemplary method flow diagram depicting a method for automatic deployment of at least one outdoor small cell, in accordance with exemplary embodiments of the present invention.

Referring to FIG. 5 illustrates an exemplary method flow diagram depicting a method for automatic deployment of at least one outdoor small cell, in accordance with exemplary embodiments of the present invention. The method starts at step [502]. At step [504], the data collection module [202] dynamically collects a traffic data corresponding to a geographic location associated with a cellular network comprising of one or more cells.

Subsequently, at step [506], the data collection module [204] automatically identifies a group of spatial grids from the one or more cells within the geographic location based on the traffic data. At step [508], the data collection module [204] automatically determines one or more locations within the geographic locations for deploying the at least one outdoor small cell based on the identified group of spatial grids.

At step [510], the backhaul link clearance module [206] automatically determines a backhaul connection between the one or more determined locations with the cellular network. Next, at step [512], the azimuth planning module [208] automatically determines an azimuth for the at least one outdoor small cell based on the determined connection. Lastly, at step [514], the method of the present invention further encompasses deploying, by a deploying unit, the at least one outdoor small cell based on at least one of the determined one or more locations, the determined azimuth and the determined backhaul connection. The method completes at step [516].

Figure 6:
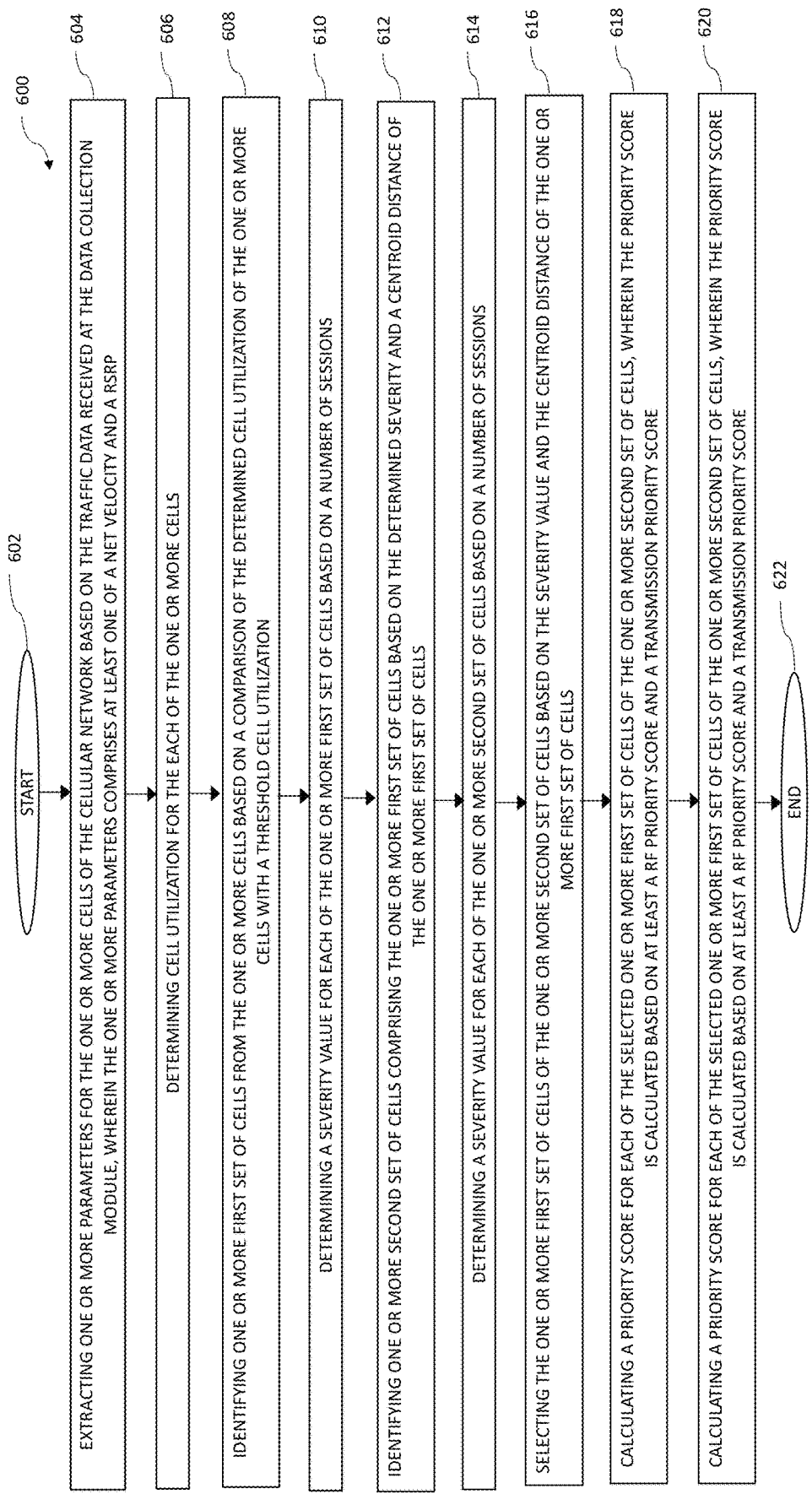
FIG. 6 illustrates an exemplary method flow diagram depicting a method for automatically identification of the group of spatial grids from the one or more cells, in accordance with exemplary embodiments of the present invention.

The present invention encompasses that the step [506] further comprises of steps as depicted in FIG. 6 illustrating an exemplary method flow diagram depicting a method for automatically identification of the group of spatial grids from the one or more cells, in accordance with exemplary embodiments of the present invention. At step [602], the data collection module [204] extracts one or more parameters for the one or more cells of the cellular network based on the traffic data received at the data collection module [202], wherein the one or more parameters comprises at least a RSRP. At step [604], the data collection module [204] determines cell utilization for the each of the one or more cells. At step [608], the data collection module [204] identifies one or more first set of spatial grids from the one or more cells based on a comparison of the determined cell utilization of the one or more cells with a threshold cell utilization. At step [610], the data collection module [204] determines a severity value for each of the one or more first set of spatial grids based on a number of sessions.

At step [612], the data collection module [204] identifies one or more second set of spatial grids comprising the one or more first set of spatial grids based on the determined severity and a centroid distance of the one or more first set of spatial grids. At step [614], the data collection module [204] determines a severity value for each of the one or more second set of spatial grids based on a number of sessions. At step [616], the data collection module [204] selects the one or more first set of spatial grids of the one or more second set of spatial grids based on the severity value and the centroid distance of the one or more first set of spatial grids. At step [618], the data collection module [204] calculates a priority score for each of the selected one or more first set of spatial grids of the one or more second set of spatial grids, wherein the priority score is calculated based on at least a RF priority score and a transmission priority score. Lastly, at step [620], the data collection module [204] identifies one or more third set of cells as the group of spatial grids based on the calculated priority score. The method completes at step [622].

Figure 7:
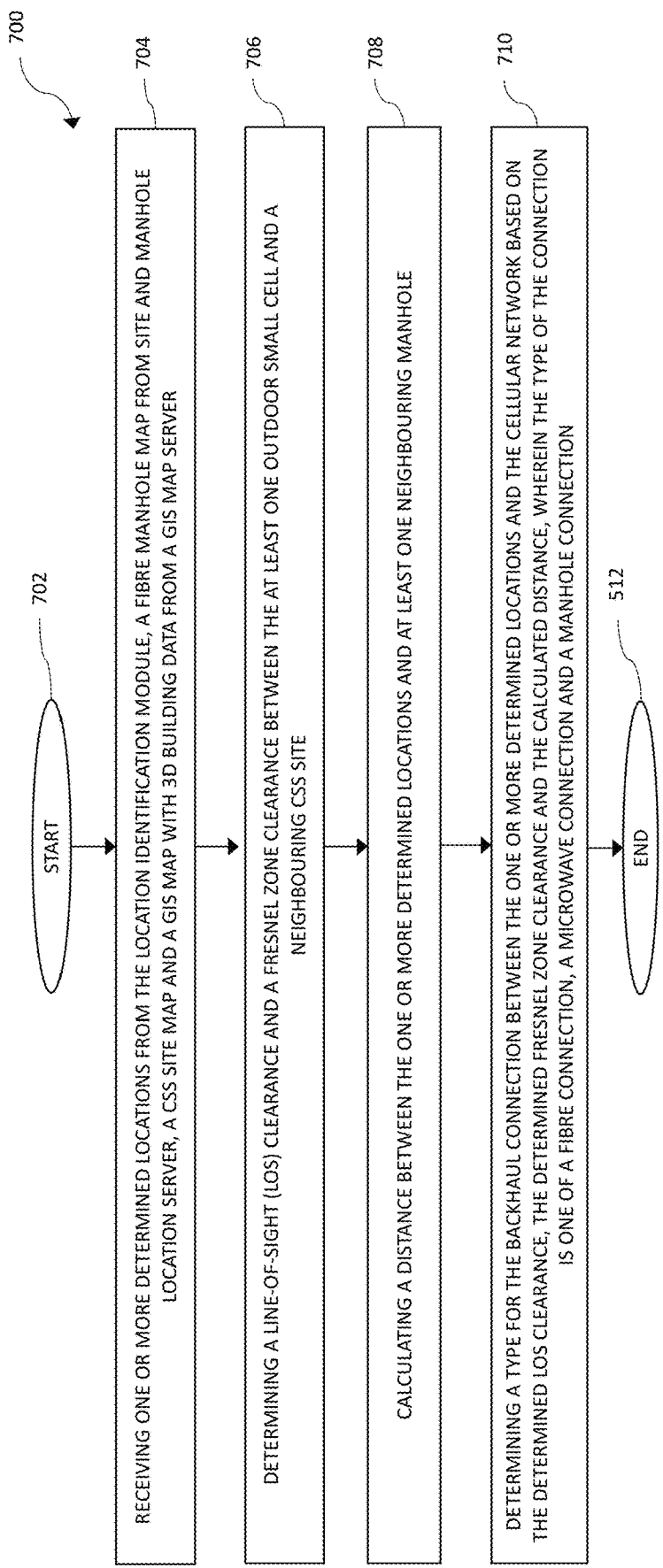
FIG. 7 illustrates an exemplary method flow diagram depicting a method for determining the backhaul connection between the one or more determined locations with the cellular network, in accordance with exemplary embodiments of the present invention.

The present invention encompasses that the step [510] further comprises of steps as depicted in FIG. 7 illustrating an exemplary method flow diagram depicting a method for determining the backhaul connection between the one or more determined locations with the cellular network, in accordance with exemplary embodiments of the present invention. The method starts at step [702]. At step [704], the backhaul link clearance module [206] receives one or more determined locations from the data collection module [204], a fiber manhole map from site and manhole location server [402], a CSS site map and a GIS Map with 3D building data from a GIS Map Server [406]. At step [706], the backhaul link clearance module [206] determines a line-of-sight (LOS) clearance and a Fresnel zone clearance between the at least one outdoor small cell and a neighbouring CSS site. At step [708], the backhaul link clearance module [206] calculates a distance between the one or more determined locations and at least one neighbouring manhole. Lastly, at step [710], the backhaul link clearance module [206] determines a type for the backhaul connection between the one or more determined locations and the cellular network based on the determined LOS clearance, the determined Fresnel zone clearance and the calculated distance, wherein the type of the connection is one of a fibre connection, a microwave connection and a manhole connection. The method completes at step [712].

Figure 8:
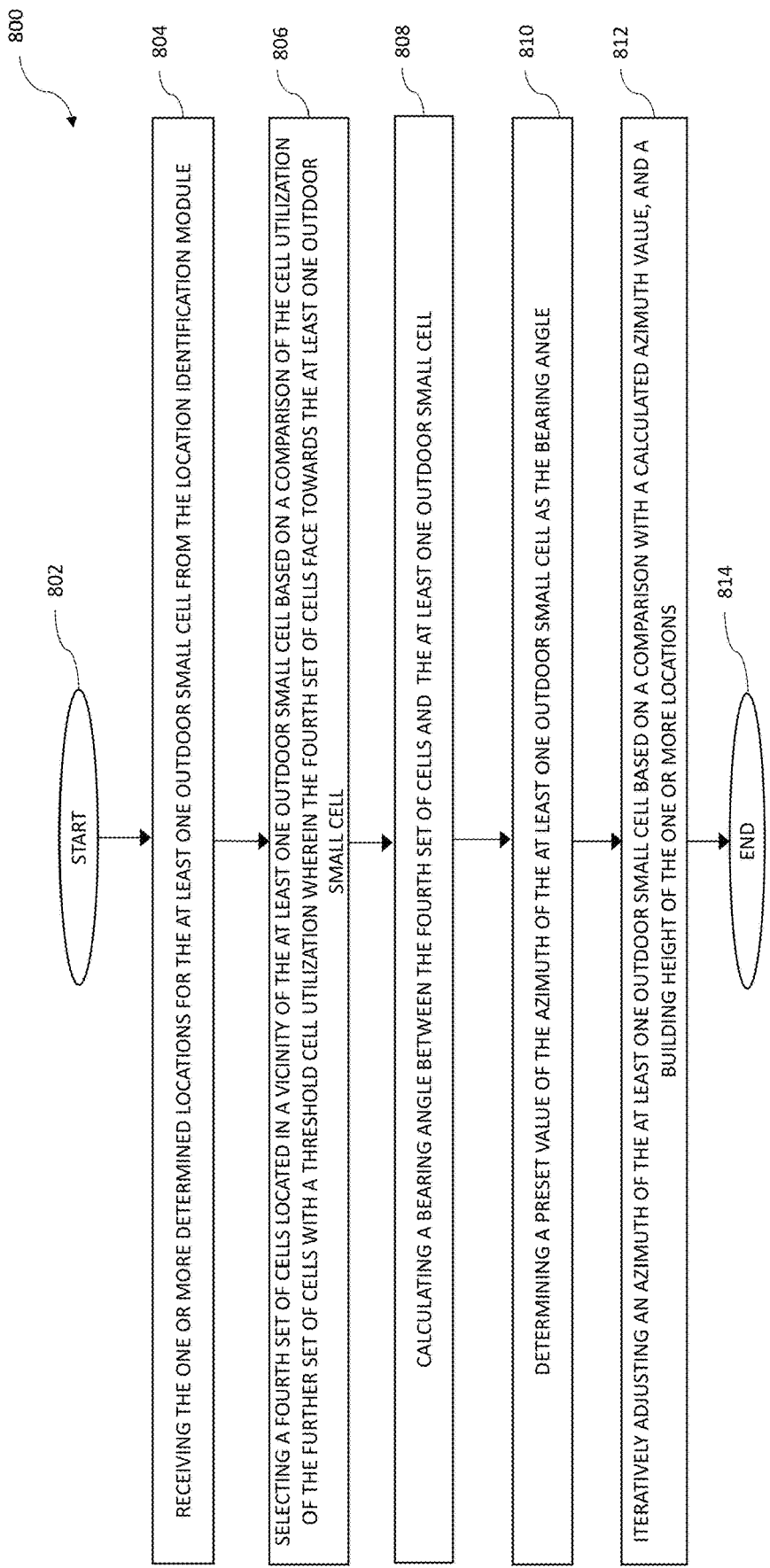
FIG. 8 illustrates an exemplary method flow diagram depicting method for determining the azimuth for the at least one outdoor small cell based on the determined connection, in accordance with exemplary embodiments of the present invention.

The present invention encompasses that the step [512] further comprises of steps as depicted in FIG. 8 illustrating an exemplary method flow diagram depicting method for determining the azimuth for the at least one outdoor small cell based on the determined connection, in accordance with exemplary embodiments of the present invention. The method initiates at step [802]. At step [804], the azimuth planning module [208] receives the one or more determined locations for the at least one outdoor small cell from the data collection module [204]. At step [806], the azimuth planning module [208] selects a set of cells located in a vicinity of the at least one outdoor small cell based on a comparison of the cell utilization of the set of cells with a threshold cell utilization (for instance, to identify highly utilized cells) wherein the set of cells face towards the at least one outdoor small cell. At step [808], the azimuth planning module [208] calculates a bearing angle between the set of cells and the at least one outdoor small cell. At step [810], the azimuth planning module [208] determines a preset value of the azimuth of the at least one outdoor small cell as the bearing angle. At step [812], the azimuth planning module [208] iteratively adjusts an azimuth of the at least one outdoor small cell based on a comparison with a calculated azimuth value, and a building height of the one or more locations. The method completes at step [814].

Figure 9A:
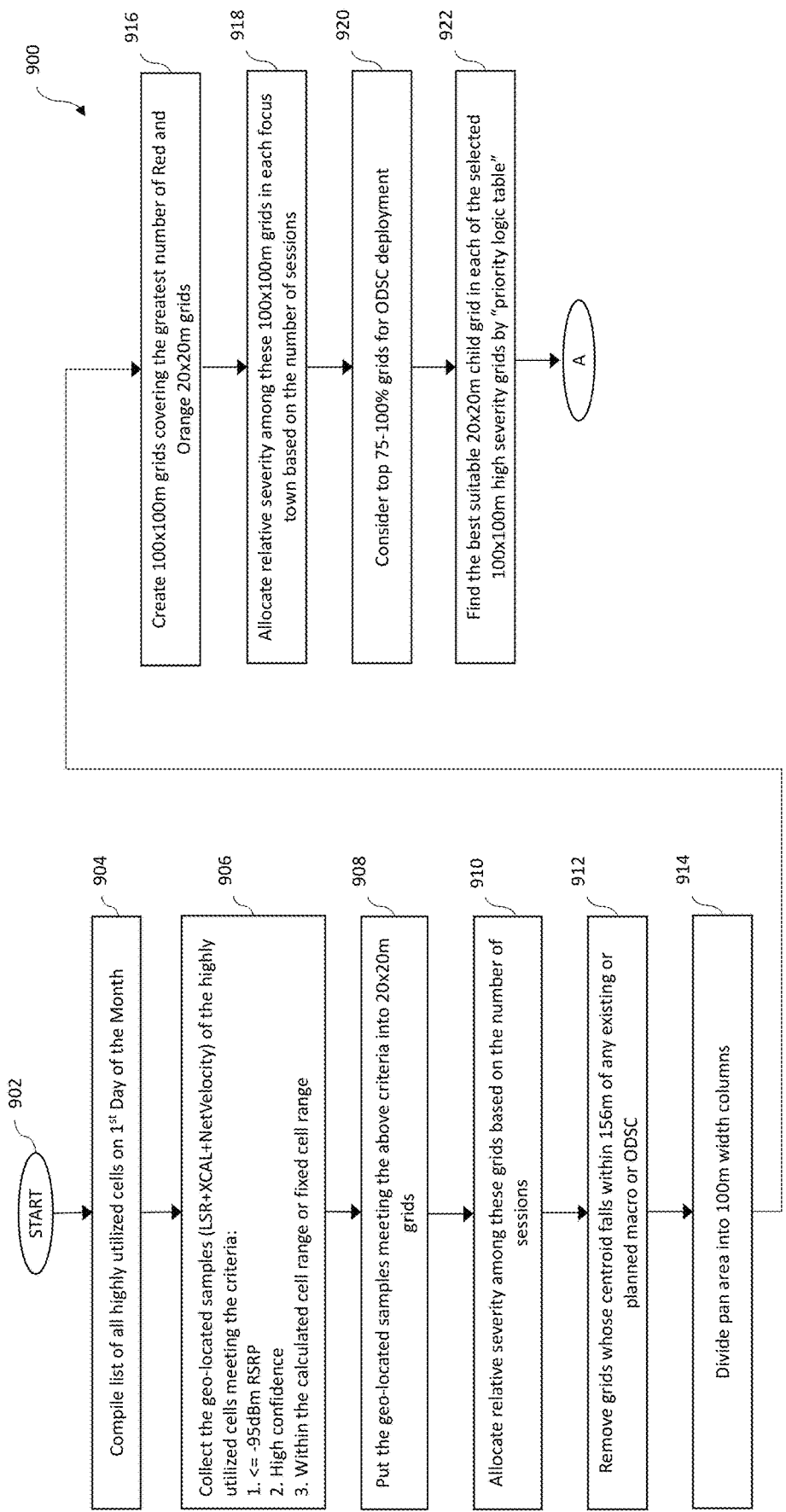
FIGS. 9A and 9B (collectively referred to as FIG. 9) illustrates an exemplary implementation of the method for automatically identification of the group of spatial grids from the one or more cells, in accordance with exemplary embodiments of the present invention.
Figure 9B:
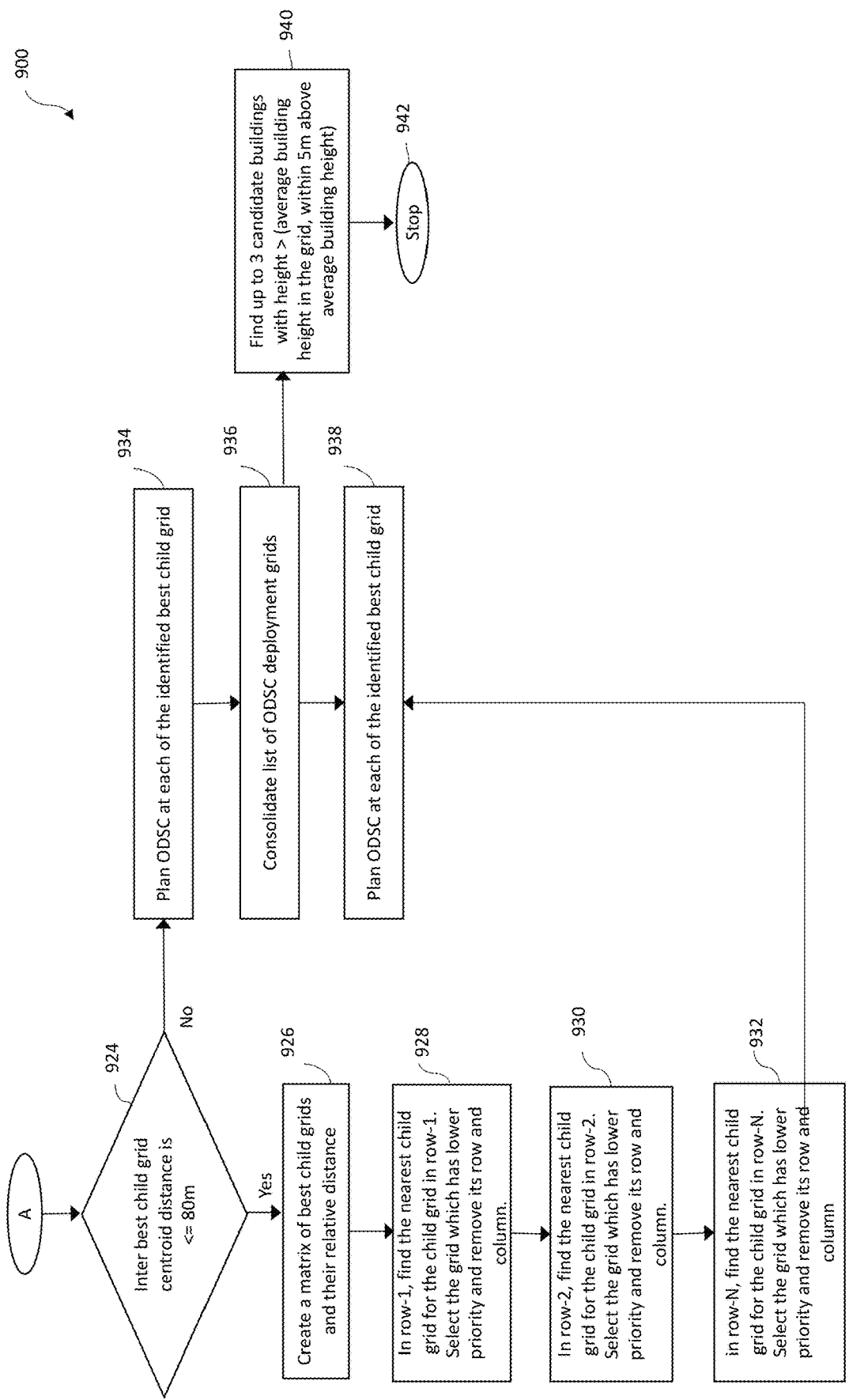

Referring to FIG. 9 illustrates an exemplary implementation of the method for automatically identification of the group of spatial grids from the one or more cells, in accordance with exemplary embodiments of the present invention. The exemplary implementation of FIG. 9 also illustrates aspect of automatic location identification for the at least one outdoor small cell deployment by the data collection module [204]. In an instance, the present invention encompasses that the data collection module [204] determines a group of spatial grids and one or more location for the at least one outdoor small cell based on user density and poor coverage. The exemplary implementation starts at step [902].

At step [904], the data collection module [204] compiles a list of all the highly utilized cells for each month. For instance, the data collection module [204] extracts one or more parameters for the one or more cells of the cellular network based on the traffic data received at the data collection module [202], wherein the one or more parameters comprises at least a RSRP. The data collection module [204] determines cell utilization for the each of the one or more cells and identifies one or more first set of spatial grids as the highly utilized cells from the one or more cells based on a comparison of the determined cell utilization of the one or more cells with a threshold cell utilization.

At step [904], the data collection module [204] collects the geo-located samples (e.g., LSR, XCAL, Net Velocity) of these highly utilized cells meeting the criteria, being firstly, RSRP<=−x dBm, where x is a threshold set for determining poor coverage, secondly, high confidence, and thirdly, that the highly utilized cells are within the calculated cell range or fixed cell range as per the planning settings, e.g., "max distance for ODSC recommendation". At step [908], the data collection module [204] assigns the geo-located samples meeting the above criteria into 20×20 m grids. At step [910], the data collection module [204] allocates relative severity among these 20*20 m grids based on a number of sessions, for instance, Red: Top 75-100%, Orange: Top 50-75%, Light Blue: Top 25-50% and Dark Blue: Bottom 0-25%.

At step [912], the data collection module [204] removes the 20*20 m grids [944] whose centroid falls within y meter, [943] of any existing or planned macro or at least one outdoor small cell, where y is the threshold minimum distance to be maintained between any existing cell and outdoor small cell. At step [914], the data collection module [204] divides the whole of the geographical location (e.g., pan India) into 100 m width columns and then creates 100*100 m grids [945] covering the greatest number of Red and Orange 20×20 m grids at step [916]. At step [918], the data collection module [204] allocates relative severity among these 100*100 m grids in each focus town based on the number of sessions, for instance, Red: Top 75-100%, Orange: Top 50-75%, Light Blue: Top 25-50% and Dark Blue: Bottom 0-25%. At step [920], the data collection module [204] selects the top 75-100% grids for the at least one outdoor small cell deployment. At step [922], the data collection module [204] determines the best suitable 20*20 m child grid [946] in each of the selected 100*100 m high severity grids by "priority logic table" as shown below in table 1.

| Priority Logic Table for Best Child Grid (20*20) Selection in 100*100m Grid | | | | | | |
|---|---|---|---|---|---|---|
| Priority Type | Parameter | Criterion | Max Weight | Priority Score | Overall Weight | Overall Priority |
| RF Priority | No. of Buildings | Own Grid Bldg Count/Best Grid Bldg Count = A | 3 | A*3 + B*3 + C*1 + G*2 + H*2 | 70% | (RF Priority Score* 0.7) + (Tx Priority Score* 0.3) |
| | No. of Landmark | Own Grid LMP Priority Score/Best Grid LMP Priority Score = A | 2 | | | |
| | Major Roads | Own Grid Length/Best Grid Length = C | 1 | | | |
| | Unique No. of Users | Own Grid User Count/Best Grid User Count = H | 2 | | | |
| | No. of Sessions | Own Grid Sessions Count/Best Grid Session Count = H | 2 | | | |
| | | Max Score | 10 | | | |
| Tx Priority | XPIC MW Site | LoS with any 1st Tier Neighbor CSS-XPIC MW Site (Yes = 1, No = 0) = D | 3 | D*3 + E*4 + F*3 | 30% | |
| | Fiber PoP | LoS with any 1st Tier Neighbor CSS-Fiber Site (Yes = 1, No = 0) = E | 4 | | | |
| | Fiber Manhole | <=100m Centroid (Yes = 1, No = 0) = F | 3 | | | |
| | | Max Score | 10 | | | |

At step [924], the data collection module [204] determines whether the inter best child grid centroid distance is less than or equal to 80 m. In an event the inter best child grid centroid distance is less than or equal to 80 m, the method proceeds to step [926] where the data collection module [204] creates a matrix of best child grids and determines their relative distances. At step [928], the data collection module [204] finds the nearest child grid for the child grid in Row-1 and selects the grid which has lower priority and remove its row and column. At step [930], the data collection module [204] finds the nearest child grid for the child grid in row-2 and selects the grid which has lower priority and remove its row and column. Iteratively, at step [932], the data collection module [204] finds the nearest child grid for the child grid in row-N and selects the grid which has lower priority and remove its row and column. The method then proceeds to step [938] where an ODSC is planned at each of the identified best child grid. Next, at step [936], a consolidated list of at least one outdoor small cell deployment grids is created and regularly updated with newly identified best child grids.

In an event the inter best child grid centroid distance is greater than 80 m, the method proceeds to step [934] where at least one outdoor small cell is planned at each of the identified best child grid. Next, at step [936], a consolidated list of at least one outdoor small cell deployment grids is created and regularly updated with newly identified best child grids.

Lastly, at step [940], the data collection module [204] finds candidate buildings with a height less than an average building height in the grid. For instance, the data collection module [204] may determine up to three candidate buildings with a height less than an average building height in the grid. In another instance, the data collection module [204] may determine up to three candidate buildings within 5 m above average building height with exceptions such as schools, restricted areas like defense areas, etc. The method completes at step [942].

Figure 10:
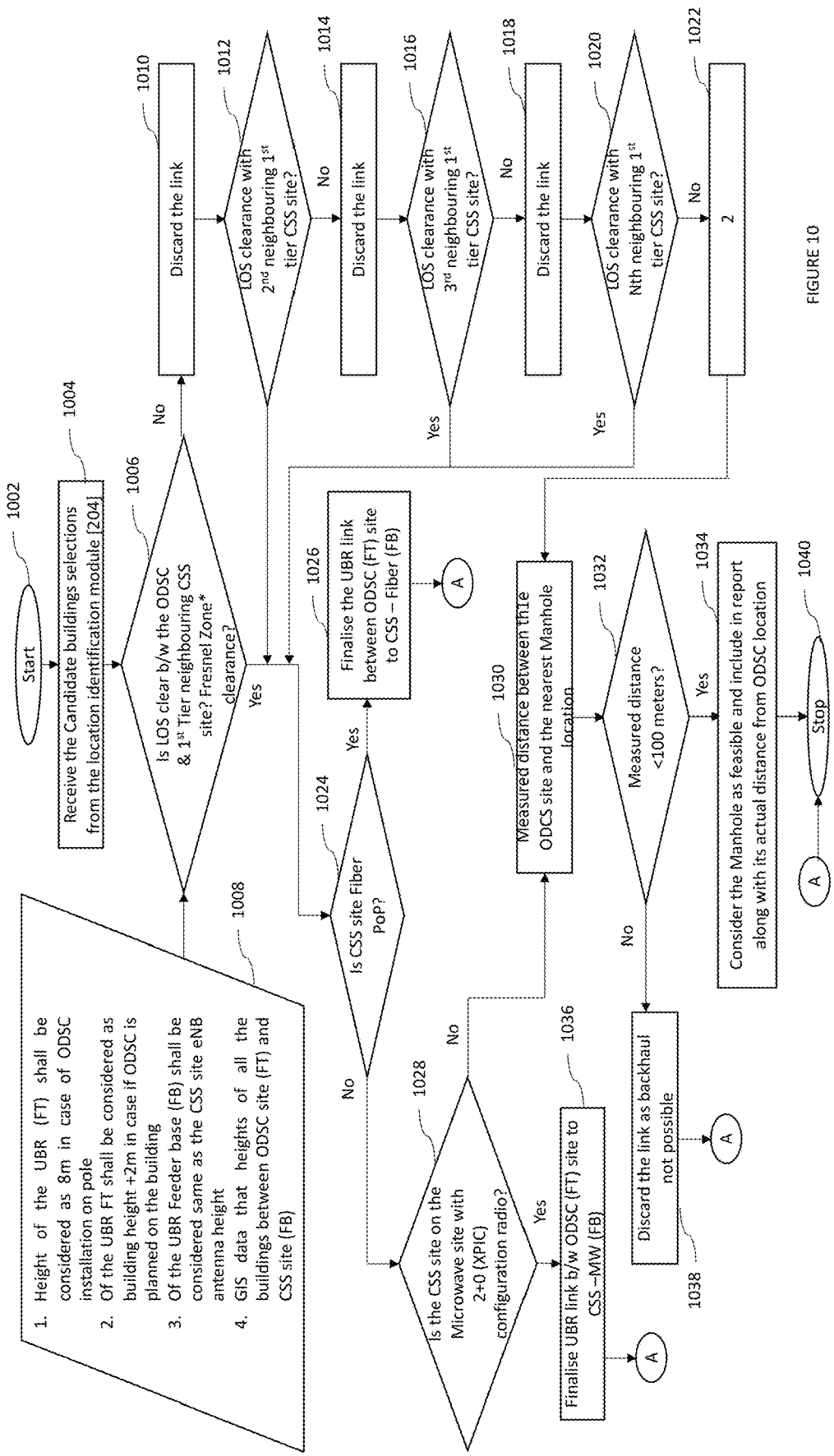
FIG. 10 illustrates an exemplary implementation of the method for determining the backhaul connection between the one or more determined locations with the cellular network, in accordance with exemplary embodiments of the present invention.

Referring to FIG. 10 illustrates an exemplary implementation of the method for determining the backhaul connection between the one or more determined locations with the cellular network, in accordance with exemplary embodiments of the present invention. The method starts at step [1002]. At step [1004], the backhaul link clearance module [206] receives inputs such as candidate locations proposed by the data collection module [204], the latitude and longitude details of Fiber Manhole from the site and manhole location server [402], CSS Site (Fiber & Microwave) locations and GIS Map of the area with 3D Building data from the GIS Map Server [406]. At step [1006], the backhaul link clearance module [206] selects the at least one outdoor small cell location proposed by the data collection module [204] for line of sight (LOS) clearance to the nearest neighboring CSS site in $1^{st}$ tier. The backhaul link clearance module [206] also checks for Fresnel Zone clearance as highlighted in FIG. 4B. At step [1008], the backhaul link clearance module [206] considers the below criterion for determining LOS and Fresnel clearance, firstly, height of the UBR (FT) shall be considered as 8 m in case of at least one outdoor small cell installation on pole, secondly, the UBR FT shall be considered as building height+2 m in case if at least one outdoor small cell is planned on the building, thirdly, the UBR Feeder base (FB) shall be considered same as the CSS site eNB antenna height and fourthly, GIS data that heights of all the buildings between at least one outdoor small cell site (FT) and CSS site (FB).

In an event the LOS and Fresnel Zone clearance is successful, the backhaul link clearance module [206] discards the link at step [1010] and proceeds to step [1012] for checking LOS clearance to next (second) nearest neighboring CSS site in the $1^{st}$ tier. In an event the LOS clearance is successful, the backhaul link clearance module [206] proceeds to step [1024], otherwise the backhaul link clearance module [206] discards the link at step [1014] and proceeds to step [1016] for checking LOS clearance to next (third) nearest neighboring CSS site in the 1$^{st}$ tier. In an event the LOS clearance is successful, the backhaul link clearance module [206] proceeds to step [1024], otherwise the backhaul link clearance module [206] iteratively discards the link at step [1018] and proceeds to step [1020] for checking LOS clearance to next (Nth) nearest neighboring CSS site in the 1$^{st}$ tier until LOS/Fresnel Zone is clear or verification is completed with all the neighbors in 1$^{st}$ tier. In an event the LOS clearance is successful, the backhaul link clearance module [206] proceeds to step [1024], otherwise the backhaul link clearance module [206] determines that the UBR is not feasible for the candidate at least one outdoor small cell location.

In an event the LOS and Fresnel Zone clearance is successful at step [1006], the backhaul link clearance module [206] checks for backhaul availability at the CSS site at step [1024]. At step [1024], the backhaul link clearance module [206] determines if CSS site has Fiber PoP. In an event the CSS site has Fiber PoP, the backhaul link clearance module [206] finalizes the UBR link between ODSC (FT) site to CSS Fiber PoP at step [1026], and the method completes at step [1040]. In an event the backhaul link clearance module [206] determines that the CSS site has no Fiber PoP, the backhaul link clearance module [206] determines whether the CSS site has Microwave with 2+0 (XPIC) configurable radio at step [1028]. In an event the CSS site has Microwave with 2+0 (XPIC) configurable radio, the backhaul link clearance module [206] determines Unlicensed Band Radio (UBR) link between ODSC (FT) site to CSS-Fiber (FB)/CSS-MW (FB) back to Outdoor small cell planner at step [1036], and thereafter the method completes at step [1040].

At step [108], in an event neither Fiber PoP nor Microwave with 2+0 (XPIC) is available at CSS site, the backhaul link clearance module [206] measures the distance between at least one outdoor small cell site and nearest manhole location at step [1030]. At step [1032], if the measured distance is within $d_m$ meters, where $d_m$ is the maximum distance to be maintained between a planned outdoor small cell and manhole, the backhaul link clearance module [206] suggests using manhole for providing backhaul solution to at least one outdoor small cell, otherwise the backhaul link clearance module [206] discards the link and report backhaul not possible in case of more than $d_m$ meters distance at step [1038]. The method completes at step [1040].

Figure 11A:
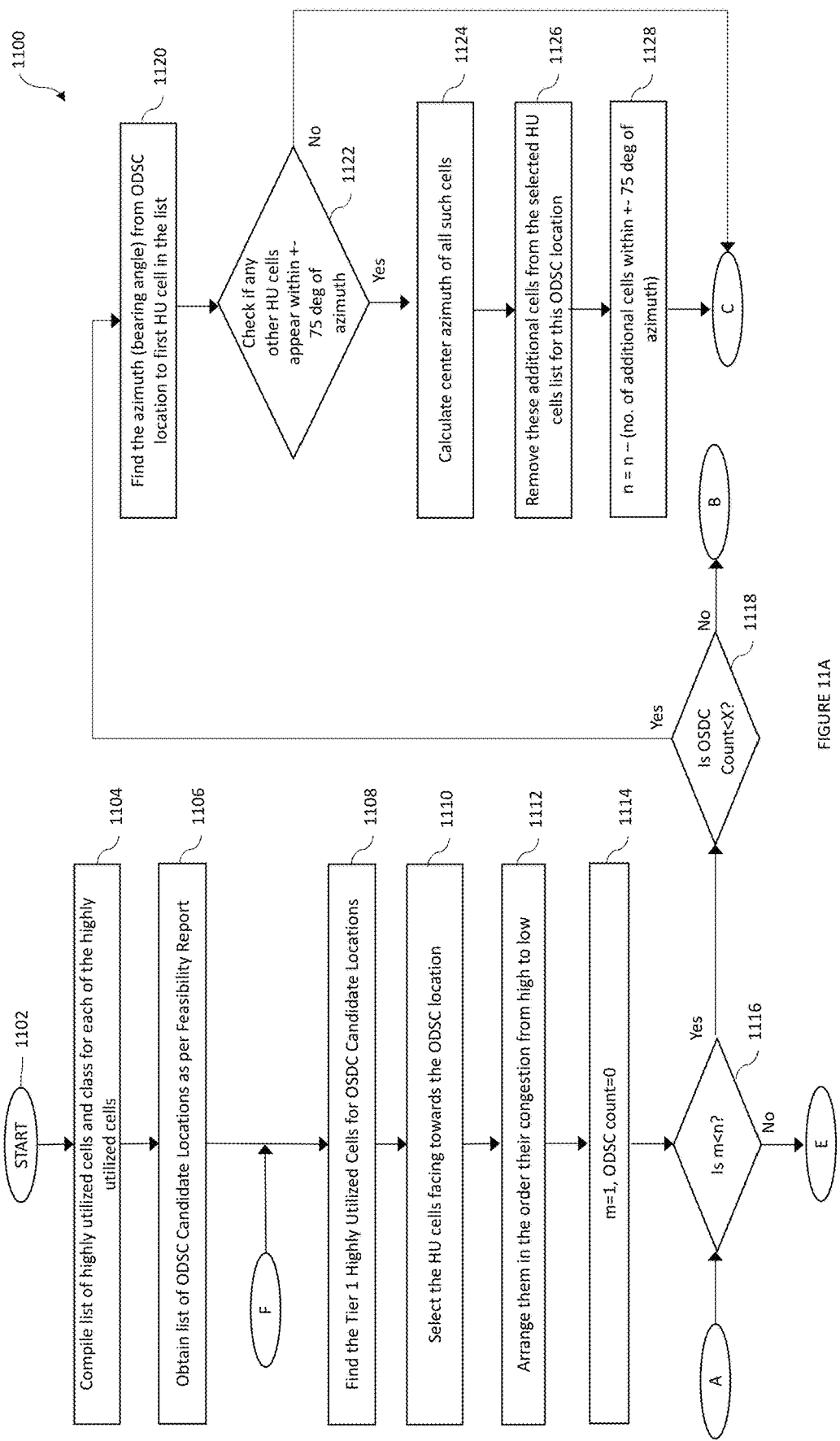
FIGS. 11A, 11B and 11C (collectively referred to as FIG. 11) illustrates an exemplary implementation of the method for determining the azimuth for the at least one outdoor small cell based on the determined connection, in accordance with exemplary embodiments of the present invention.
Figure 11B:
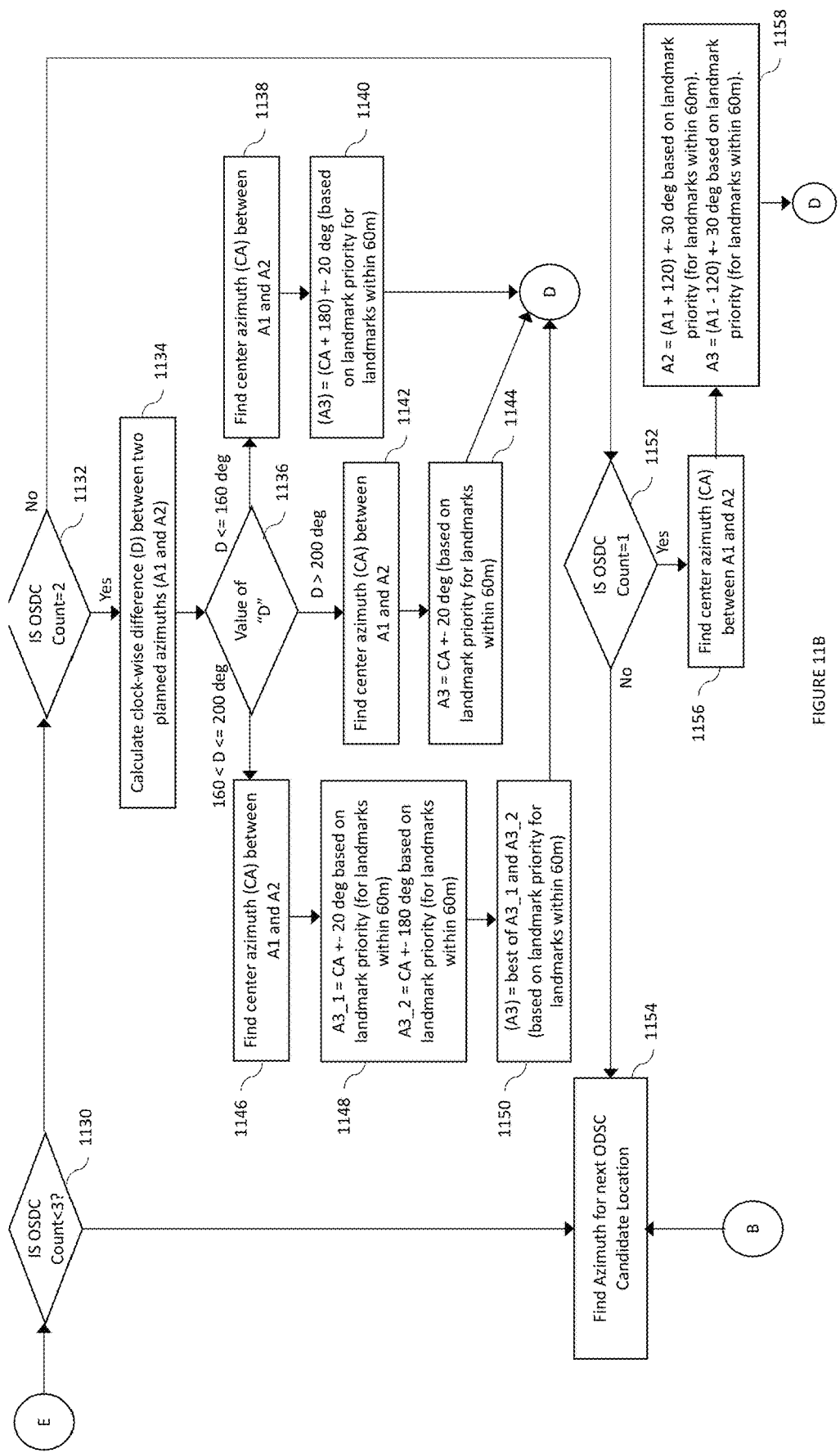
Figure 11C:
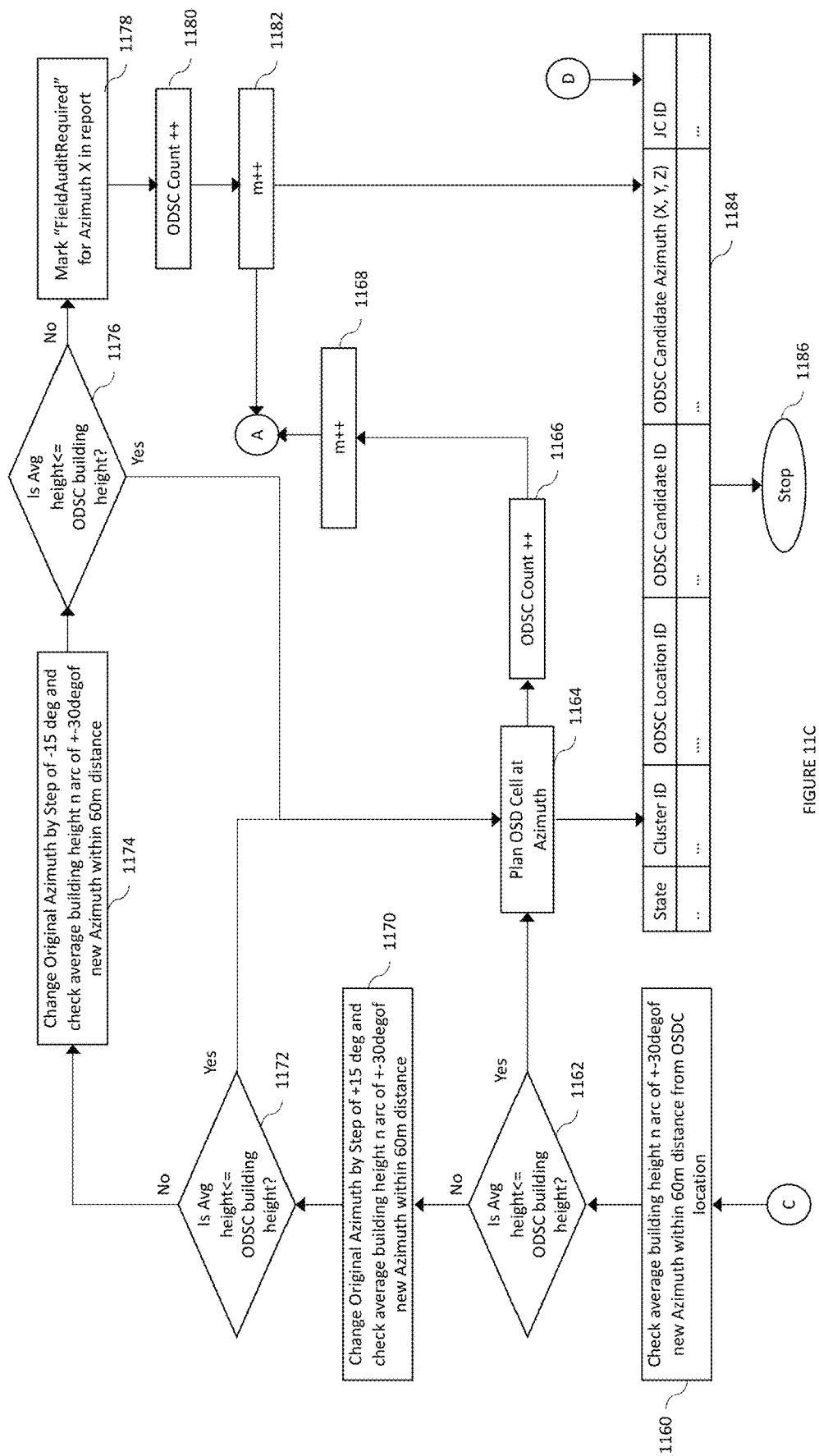

Referring to FIG. 11 illustrates an exemplary implementation of the method for determining the azimuth for the at least one outdoor small cell based on the determined connection, in accordance with exemplary embodiments of the present invention. The method starts at step [1102]. At step [1104], the azimuth planning module [208] receives as inputs the list of highly utilized cells along with their Congestion Class details, Morphology and Building Database, Landmarks and their Priority, at least one outdoor small cell candidate/location list (C1, C2 and C3) from the data collection module [204]. At step [1106], the azimuth planning module [208] obtains list of at least one outdoor small cell Candidate Locations as per Feasibility Report. At step [1108], the azimuth planning module [208] determines the Tier 1 Highly Utilized Cells for OSDC Candidate Locations.

At step [1108], the azimuth planning module [208] selects the Highly Utilized cells facing towards the at least one outdoor small cell location, say, with an azimuth within +−45 deg of bearing angle. At step [1108], the azimuth planning module [208] arranges such Highly utilized cells in the order their congestion from high to low. Considering 'n' is the number of highly utilized cells and start with a variable "m" equal to 1 and an "ODSC-count" equal to zero, the azimuth planning module [208] finds the azimuth (bearing angle) from at least one outdoor small cell location to first Highly utilized cell in the list in steps [1116-1120].

At step [1122], the azimuth planning module [208] check if any other highly utilized cells appear within +−75 deg of azimuth and calculates a center azimuth of all such cells at step [1124]. At step [1126], the azimuth planning module [208] removes the additional cells from the selected Highly utilized cells list for this at least one outdoor small cell location, at step [1128] recalculates n as n minus (−) no. of additional cells within +−75 deg of azimuth. Further, at step [1160], the azimuth planning module [208] checks average building height in an arc of +−30 deg span of the azimuth within 60 m distance from at least one outdoor small cell location. At step [1162], the azimuth planning module [208] determines whether average height is less than or equal to at least one outdoor small cell building height. In event the average height is less than or equal to at least one outdoor small cell building height, the azimuth planning module [208] plans at least one outdoor small cell at the determined azimuth at step [1164].

In an event the azimuth planning module [208] determines that the average height is greater than the at least one outdoor small cell building height, at step [1170], the azimuth planning module [208] changes the original azimuth by +15 and further determines if the average height is less than or equal to at least one outdoor small cell building height at step [1172]. In an event the azimuth planning module [208] finds that the average height is less than or equal to at least one outdoor small cell building height at step [1172], the method proceeds to step [1164] the azimuth planning module [208] plans at least one outdoor small cell at the determined azimuth. In an event, the azimuth planning module [208] finds that the average height is greater than the at least one outdoor small cell building height at step [1172], the azimuth planning module [208] changes the original azimuth by −15 at step [1174] and further determines if the average height is less than or equal to at least one outdoor small cell building height at step [1176]. Accordingly, in event the average height is less than or equal to at least one outdoor small cell building height, the method proceeds to step [1164] the azimuth planning module [208] plans at least one outdoor small cell at the determined azimuth, otherwise the azimuth planning module [208] sets the status for the at least one outdoor small cell candidate location as "field audit required" in the report and increment 'm' and 'ODSC-count' by one at steps [1180 and 1182], and method thereafter proceeds to step [1116]. Accordingly, after step [1164], the azimuth planning module [208] increments 'm' and the 'ODSC-count' by one, and method thereafter proceeds to step [1116].

At step [1116], the azimuth planning module [208] checks for the condition 'm<n'. If satisfied, at step [1118], the azimuth planning module [208] checks for the condition 'ODSC-count<3'. The azimuth planning module [208] then finds azimuth from at least one outdoor small cell location to next highly utilized cell in the list and repeat the same procedure from step [1112] when 'true' as above, and directly proceed to step [1160] when 'false'. However, if the condition 'm<n' is not satisfied at step [1116], the azimuth planning module [208] checks for the condition 'ODSC-count<3' at step [1130]. The azimuth planning module [208] then checks for the condition 'ODSC-count =2' at step [1132]. If the condition 'ODSC-count=2' is true, then the method proceeds to step [1134] for calculating clockwise difference (D) between two planned azimuths (A1 and A2).

At step [1136], the azimuth planning module [208] calculates a value of D and determines whether one of the conditions exists 160<D<=200 degrees or D>200 degrees or D<=160 degrees. If 160<D<=200 degrees, the method proceeds to step [1146] to find center azimuth (CA) between A1 and A2. Further, the method comprises calculating A3_1=CA +-20 deg based on landmark priority (for landmarks within 60 m) and A3_2=CA+-180 deg based on landmark priority (for landmarks within 60 m) at step [1148]. At step [1150], the azimuth planning module [208] determines the third at least one outdoor small cell azimuth (A3)=best of A3_1 and A3_2 (based on landmark priority for landmarks within 60 m). The method thereafter proceeds to step [1184] where the azimuth for OSDC cell is updated in the consolidated list.

At step [1136], if D>200 degrees, the method proceeds to step [1142] to find center azimuth (CA) between A1 and A2, and to calculate a third at least one outdoor small cell azimuth (A3)=CA+-20 deg (based on landmark priority for landmarks within 60 m) at step [1144]. The method thereafter proceeds to step [1184] where the azimuth for OSDC cell is updated in the consolidated list and completes at step [1186].

At step [1136], if D<=160 degrees, the method proceeds to step [1138] to find center azimuth (CA) between A1 and A2 and to calculate a third at least one outdoor small cell azimuth (A3)=(CA+180)+-20 deg (based on landmark priority for landmarks within 60 m) at step [1140]. The method thereafter proceeds to step [1184] where the azimuth for OSDC cell is updated in the consolidated list and completes at step [1186].

However, if the condition 'ODSC-count =2' is not true at step [1132], the azimuth planning module [208] checks for the condition 'ODSC-count =1' at step [1152]. If the condition is true, the azimuth planning module [208] finds new possible azimuths at step [1156] and calculates A2=(A1 +120)+-30 deg based on landmark priority (for landmarks within 60 m) and A3=(A1-120)+-30 deg based on landmark priority (for landmarks within 60 m) at step [1158] and determines a second ODSC azimuth=best of A2 and A3 (based on landmark priority for landmarks within 60 m). The method thereafter proceeds to step [1184] where the azimuth for OSDC cell is updated in the consolidated list and completes at step [1186]. At step [1152], if the condition is false, the azimuth planning module [208] proceeds to step [1154] to find Azimuth for next at least one outdoor small cell Candidate Location and the method proceeds as described above.

The novel solution of the present invention provides a system and a method for automatic deployment of outdoor small cells in a geographical location to solve the problem of deployment in highly congested and poor coverage areas in an efficient and cost-effective manner without the requirement of performing manual drive tests in a heterogeneous network. Thus, the present invention provides for deploying outdoor small cells to improve user experience dramatically by offloading them from far away macro cells and facilitates cellular networks to handle high volume calls concurrently.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the invention herein, whereby it is to be distinctly understood that the foregoing descriptive matter to be implemented merely as illustrative of the invention and not as limitation.

We claim:

1. A method for automatic deployment of at least one outdoor small cell in a geographic location, the method configured to minimize interference, the method comprising:

dynamically collecting, by a data collection module, a traffic data corresponding to a geographic location associated with a cellular network comprising of one or more cells;

identifying, by a location identification module, a group of spatial grids from the one or more cells within the geographic location based on the traffic data, comprising:

extracting one or more parameters for the one or more cells of the cellular network based on the traffic data received at the data collection module, wherein the one or more parameters comprise at least a Reference Signal Receive Power (RSRP);

determining cell utilization for the each of the one or more cells;

identifying one or more first set of spatial grids from the one or more cells based on a comparison of the determined cell utilization of the one or more cells with a threshold cell utilization;

determining a severity value for each of the one or more first set of spatial grids based on a number of sessions;

identifying one or more second set of spatial grids comprising the one or more first set of spatial grids based on the determined severity and a centroid distance of the one or more first set of spatial grids;

determining a severity value for each of the one or more second set of spatial grids based on a number of sessions;

selecting the one or more first set of spatial grids of the one or more second set of spatial grids based on the severity value and the centroid distance of the one or more first set of spatial grids;

calculating a priority score for each of the selected one or more first set of spatial grids of the one or more second set of spatial grids, wherein the priority score is calculated based on at least a RF priority score and a transmission priority score; and identifying one or more third set of cells as the group of spatial grids based on the calculated priority score;

determining, by the location identification module, one or more locations within the geographic locations for deploying the at least one outdoor small cell based on the identified group of spatial grids, to minimize interference within the one or more cells;

determining, by a backhaul link clearance module, a backhaul connection between the one or more determined locations with the cellular network;

determining, by an azimuth planning module, an azimuth for the at least one outdoor small cell based on the determined connection; and deploying, by a deployment unit, the at least one outdoor small cell based on at least one of the determined one or more locations, the determined azimuth and the determined backhaul connection.

2. The method as claimed in claim 1, wherein the determining the backhaul connection between the one or more determined locations with the cellular network by the backhaul link clearance module further comprises:
  receiving one or more determined locations from the location identification module, a fibre manhole map from site and manhole location server, a CSS site map and a GIS Map with 3D building data from a Geographic Information System (GIS) Map Server;
  determining a line-of-sight (LOS) clearance and a Fresnel zone clearance between the at least one outdoor small cell and a neighbouring CSS site;
  calculating a distance between the one or more determined locations and at least one neighbouring manhole; and
  determining a type for the backhaul connection between the one or more determined locations and the cellular network based on the determined LOS clearance, the determined Fresnel zone clearance and the calculated distance, wherein the type of the connection is one of a fibre connection, a microwave connection and a manhole connection.

3. The method as claimed in claim 1, wherein determining the azimuth for the at least one outdoor small cell based on the determined connection by the azimuth planning module further comprises:
  receiving the one or more determined locations for the at least one outdoor small cell from the location identification module;
  selecting a set of cells located in a vicinity of the at least one outdoor small cell based on a comparison of the cell utilization of the set of cells with a threshold cell utilization wherein the set of cells face towards the at least one outdoor small cell;
  calculating a bearing angle between the set of cells and the at least one outdoor small cell;
  determining a preset value of the azimuth of the at least one outdoor small cell as the bearing angle; and
  iteratively adjusting an azimuth of the at least one outdoor small cell based on a comparison with a calculated azimuth value, and a building height of the one or more locations.

4. A system for automatic deployment of at least one outdoor small cell in a geographic location, the system configured to minimize interference, the system comprising a processor and a memory storing instructions, which when executed by the processor, cause the system to:
  dynamically collect a traffic data corresponding to a geographic location associated with a cellular network comprising of one or more cells;
  automatically identify a group of spatial grids from the one or more cells within the geographic location based on the traffic data, by:
  extracting one or more parameters for the one or more cells of the cellular network based on the traffic data, wherein the one or more parameters comprise at least a Reference Signal Receive Power (RSRP);
  determining cell utilization for the each of the one or more cells;
  identifying one or more first set of spatial grids from the one or more cells based on a comparison of the determined cell utilization of the one or more cells with a threshold cell utilization;
  determining a severity value for each of the one or more first set of spatial grids based on a number of sessions;
  identifying one or more second set of spatial grids comprising the one or more first set of spatial grids based on the determined severity and a centroid distance of the one or more first set of spatial grids;
  determining a severity value for each of the one or more second set of spatial grids based on a number of sessions;
  selecting the one or more first set of grids of the one or more second set of spatial grids based on the severity value and the centroid distance of the one or more first set of spatial grids;
  calculating a priority score for each of the selected one or more first set of spatial grids of the one or more second set of spatial grids, wherein the priority score is calculated based on at least a RF priority score and a transmission priority score;
  identifying one or more third set of cells as the group of spatial grids based on the calculated priority score;
    automatically determine one or more locations within the geographic locations for deploying the at least one outdoor small cell based on the identified group of spatial grids,
  to minimize interference within the one or more cells;
  automatically determine a backhaul connection between the one or more determined locations with the cellular network;
  automatically determine an azimuth for the at least one outdoor small cell based on the determined connection; and
  deploy the at least one outdoor small cell based on at least one of the determined one or more locations, the determined azimuth and the determined backhaul connection.

5. The system as claimed in claim 4, wherein, to determine the backhaul connection between the one or more determined locations with the cellular network, the processor is further configured to:
  receive a fibre manhole map from site and manhole location server, a CSS site map and a GIS Map with 3D building data from a Geographic Information System (GIS) Map Server;
  determine a line-of-sight (LOS) clearance and a Fresnel zone clearance between the at least one outdoor small cell and a neighbouring CSS site;
  calculate a distance between the one or more determined locations and at least one neighbouring manhole; and
  determine a type for the backhaul connection between the one or more determined locations and the cellular network based on the determined LOS clearance, the determined Fresnel zone clearance and the calculated distance, wherein the type of the connection is one of a fibre connection, a microwave connection and a manhole connection.

6. The system as claimed in claim 4, wherein, to determine the azimuth for the at least one outdoor small cell, the processor is further configured to:
  select a set of cells located in a vicinity of the at least one outdoor small cell based on a comparison of the cell utilization of the set of cells with a threshold cell utilization wherein the set of cells face towards the at least one outdoor small cell;
  calculate a bearing angle between the set of cells and the at least one outdoor small cell;
  determine a preset value of the azimuth of the at least one outdoor small cell as the bearing angle; and
  iteratively adjust an azimuth of the at least one outdoor small cell based on a comparison with a calculated azimuth value, and a building height of the one or more locations.

* * * * *